(12) United States Patent
Rodriguez

(10) Patent No.: US 9,297,424 B2
(45) Date of Patent: Mar. 29, 2016

(54) DRIVESHAFT ASSEMBLY WITH TORQUE CONTROL MECHANISM

(71) Applicant: GM GLOBAL TECHNOLOGY OPERATIONS LLC, Detroit, MI (US)

(72) Inventor: Rolando V. Rodriguez, Metamora, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 31 days.

(21) Appl. No.: 14/244,348

(22) Filed: Apr. 3, 2014

(65) Prior Publication Data

US 2015/0285314 A1    Oct. 8, 2015

(51) Int. Cl.
| | |
|---|---|
| *F16C 3/02* | (2006.01) |
| *F16D 7/02* | (2006.01) |
| *F16B 21/14* | (2006.01) |
| *B60K 17/22* | (2006.01) |
| *F16B 21/12* | (2006.01) |

(52) U.S. Cl.
CPC ................ *F16D 7/028* (2013.01); *B60K 17/22* (2013.01); *F16B 21/125* (2013.01); *F16C 3/02* (2013.01); *F16B 2021/14* (2013.01)

(58) Field of Classification Search
CPC ........... B60K 17/22; F16C 3/02; F16B 21/12; F16B 21/125; F16B 2021/14; F16D 3/06; F16D 7/028; F16D 13/24–13/28; F16D 13/32; F16D 13/34; F16D 13/66; F16D 43/218

USPC ........ 464/42–44, 162; 403/306, 359.1–359.6, 403/378, 379.2, 379.4, 379.6; 192/66.2, 192/66.22, 66.23, 85.21

See application file for complete search history.

(56) References Cited

U.S. PATENT DOCUMENTS

| | | | | |
|---|---|---|---|---|
| 1,198,421 | A * | 9/1916 | Conklin | 464/44 |
| 2,569,144 | A * | 9/1951 | Benson | 464/44 |
| 4,617,003 | A * | 10/1986 | Bober et al. | 464/48 |
| 5,525,112 | A * | 6/1996 | Smith | 464/162 |
| 8,257,182 | B2* | 9/2012 | Falk | 464/37 |
| 2008/0214313 | A1* | 9/2008 | Jaeger | 464/38 |
| 2009/0082116 | A1* | 3/2009 | Baechle et al. | 464/162 |
| 2012/0073928 | A1* | 3/2012 | Jaeger | 192/46 |

* cited by examiner

*Primary Examiner* — Josh Skroupa
(74) *Attorney, Agent, or Firm* — Quinn Law Group, PLLC

(57) ABSTRACT

A driveshaft assembly includes a driveshaft tube having two ends. An end fitting is operatively connected to one of the two ends of the driveshaft tube. A torque control mechanism is operatively connected to the end fitting. The torque control mechanism includes an outer member defining a first conical surface extending circumferentially relative to a central axis. The torque control mechanism includes an inner member defining a second conical surface extending circumferentially relative to the central axis. The first conical surface is configured to be in contact with the second conical surface so as to transfer a torque load from the inner member to the outer member. The second conical surface is configured to rotate relative to the first conical surface along the central axis at a slip angle when the torque load exceeds a predefined maximum torque load.

17 Claims, 2 Drawing Sheets

DRIVESHAFT ASSEMBLY WITH TORQUE CONTROL MECHANISM

TECHNICAL FIELD

The disclosure relates generally to a driveshaft assembly having a torque control mechanism and a vehicle having the same.

BACKGROUND

Vehicles generally include an engine to generate a drive force or torque and a transmission or gearbox for adapting the drive force produced by the engine. A driveshaft assembly, sometimes referred to as a propeller shaft, may be used to transmit the output torque from the engine or transmission to one or more axles of the vehicle for delivery to the vehicle wheels.

SUMMARY

A driveshaft assembly includes a driveshaft tube having two ends. An end fitting is operatively connected to one of the two ends of the driveshaft tube and has first and second yoke ears. A torque control mechanism is operatively connected to the end fitting. The torque control mechanism includes an outer member operatively connected to the end fitting. The outer member defines a first conical surface extending circumferentially relative to a central axis. The outer member may be integrally formed with the end fitting.

The torque control mechanism includes an inner member configured to engage with the outer member and having respective first and second inner ends. The inner member defines a second conical surface extending circumferentially relative to the central axis at the respective first inner end. The first conical surface is configured to be in contact with the second conical surface so as to transfer a torque load from the inner member to the outer member. A predefined maximum torque load that can be transmitted from the inner member to the outer member depends at least partially on the friction force between the first and second conical surfaces. The first and second conical surfaces rotating synchronously when the torque load is less than the predefined maximum torque load. The second conical surface is configured to be angularly displaced or rotate relative to the first conical surface along the central axis at a slip angle when the torque load exceeds the predefined maximum torque load. The torque control mechanism is configured to protect the components of the driveshaft assembly when the torque load exceeds the predefined maximum torque load.

The driveshaft assembly may be operatively connected to an output member of a transmission in a vehicle. The output member is configured to supply the torque load to the inner member. The output member includes a sleeve with an interior splined portion. The inner member defines an exterior splined portion at the respective second inner end. The interior splined portion of the output member is configured to rotatably engage with the exterior splined portion of the inner member in order to supply the torque load to the inner member.

A first through-hole extends between the respective first and the second inner ends of the inner member. A second through-hole extends through the outer member. The first and second through-holes are co-axially aligned relative to the central axis. A fastener is configured to extend through the first and second through-holes.

A securing member may be operatively connected to the fastener. The securing member includes a cavity having an internal threaded portion and configured to receive the fastener. The fastener includes a head and a shank, with the shank defining an external threaded portion. The internal threaded portion of the securing member and the external threaded portion of the fastener are configured to be in contact so as to define a fastener tension. The predefined maximum torque load is proportional to the fastener tension such that an increase in the fastener tension leads to an increase in the predefined maximum torque load. A first washer may be positioned at least partially around the fastener, between the securing member and the inner member. The fastener may include multiple washers.

The fastener may define a slot extending in a direction substantially perpendicular to the central axis. The securing member may define at least one passageway. A pin is configured to extend through the slot in the fastener and the passageway in the securing member. The pin includes a pin body and first and second pin ends, the first and second pin ends are each configured to be folded relative to the pin body.

A seal member is configured to at least partially encapsulate the inner member and the outer member at the respective first inner end. The seal member defines first and second ridges extending around the central axis. The second ridge is axially spaced from the first ridge. The seal member defines a valley between the first and second ridges. A clamping member may be positioned sufficiently tightly around the seal member so as to prevent a relative motion between the seal member and the outer member. The seal member may be composed of a flexible material that offers a surface that is useful for sealing. The seal member may be composed of an elastomeric material.

The above features and advantages and other features and advantages of the present invention are readily apparent from the following detailed description of the best modes for carrying out the invention when taken in connection with the accompanying drawings.

DETAILED DESCRIPTION

Figure 1:
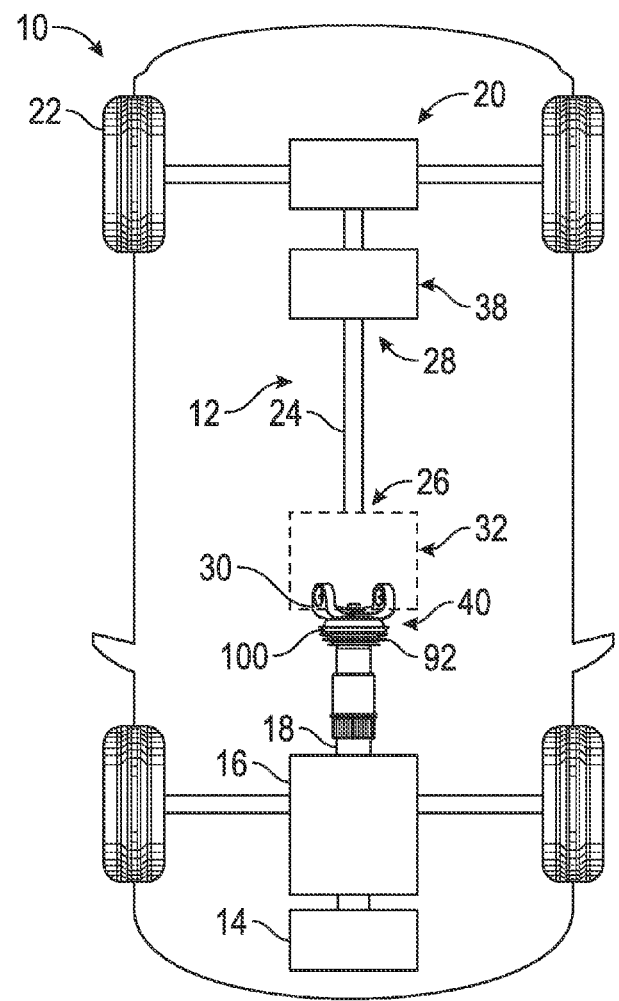
FIG. 1 is a schematic illustration of a vehicle having a driveshaft assembly with an end fitting and outer member.

Referring to the Figures, wherein like reference numbers refer to the same or similar components throughout the several views, FIG. 1 is a schematic view of an exemplary vehicle 10 having a driveshaft assembly 12. FIG. 1 is not drawn to scale. The vehicle 10 may be any passenger or commercial automobile such as a hybrid electric vehicle, including a plug-in hybrid electric vehicle, an extended range electric vehicle, or other vehicles. The vehicle 10 may take many different forms and include multiple and/or alternate components and facilities. While an example vehicle 10 is shown in the Figures, the components illustrated in the Figures are not intended to be limiting. Indeed, additional or alternative components and/or implementations may be used.

Referring to FIG. 1, the vehicle 10 includes an engine 14 and a transmission 16. The engine 14 may be an internal combustion engine configured to convert energy from a fossil fuel into rotational motion using a thermodynamic cycle. The transmission 16 includes an output member 18 extending from the transmission 16. Referring to FIG. 1, the driveshaft assembly 12 may be operatively connected to the output member 18 at one end and to an axle assembly 20 at another end. The driveshaft assembly 12 transmits the drive force or torque generated by the engine 12 to the axle assembly 20 for delivery to the vehicle wheels 22. Alternatively, the vehicle 10 may include a transfer case (not shown) operatively connected to the driveshaft assembly 12.

Figure 2:
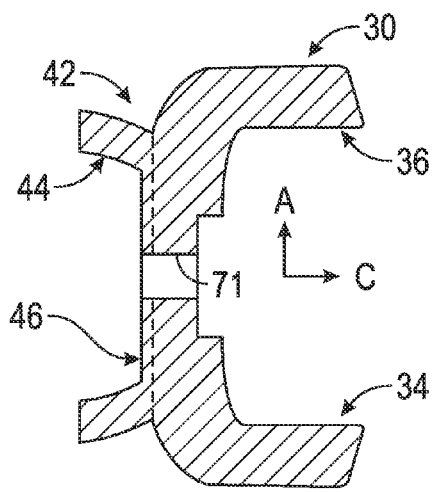
FIG. 2 is a schematic fragmentary sectional view of the end fitting and outer member of the driveshaft assembly of FIG. 1.

The driveshaft assembly 12 may be a single or multi-piece driveshaft. Referring to FIG. 1, the driveshaft assembly 12 includes a driveshaft tube 24 having first and second tube ends 26, 28. Referring to FIG. 1, an end fitting 30 (also shown in FIGS. 2-3) is operatively connected to the first tube end 26 of the driveshaft tube 24. FIG. 2 is a schematic sectional view of the end fitting 30 (and an outer member 42 described below). In the example shown, the end fitting 30 is embodied as an end yoke of a first articulating joint assembly 32, such as a universal joint assembly. However, the end fitting 30 may also be embodied as a stub shaft or other known torque transmitting end fittings.

Figure 3:
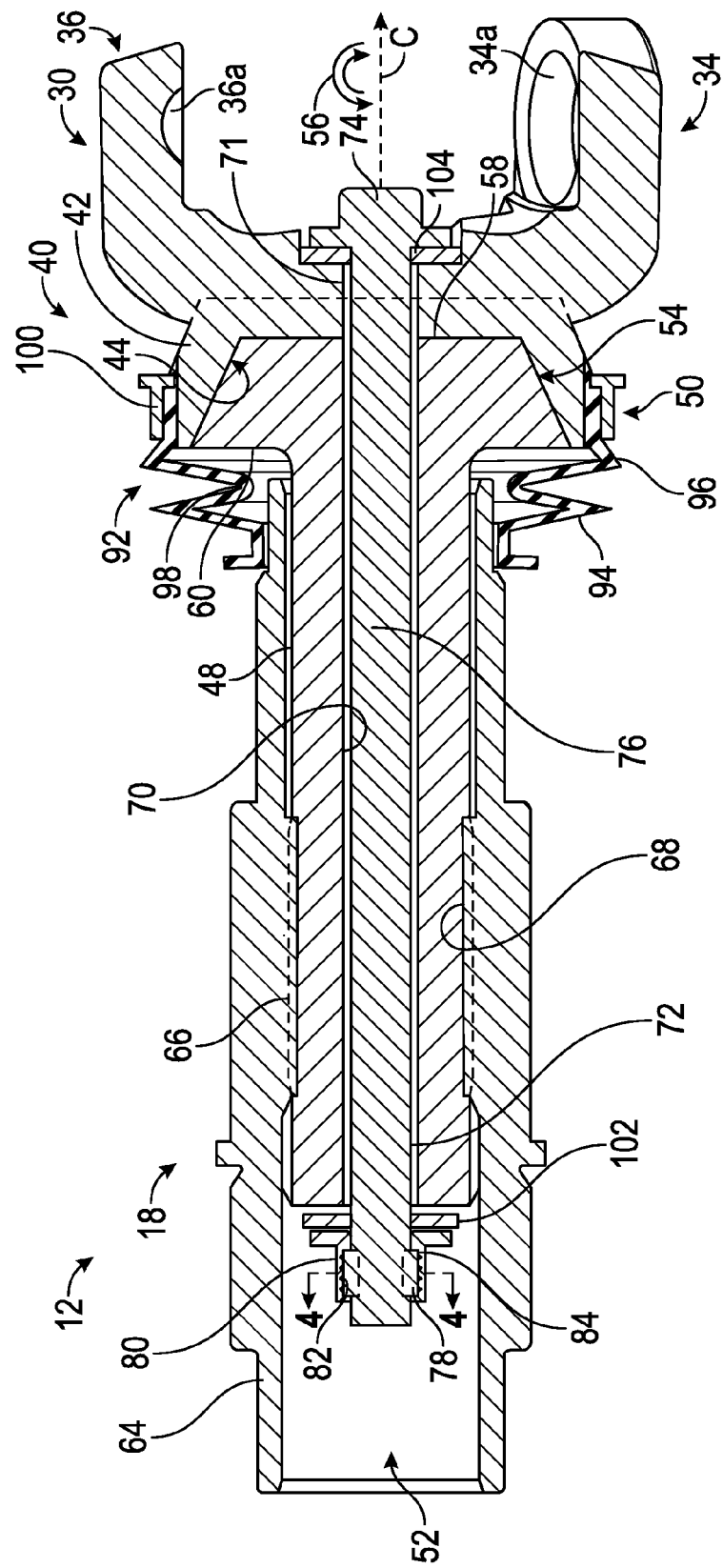
FIG. 3 is a schematic partly-sectional view of a portion of the driveshaft assembly shown in FIG. 1.

FIG. 3 is a schematic fragmentary partly-sectional view of a portion of the driveshaft assembly 12. Referring to FIGS. 2 and 3, the end fitting 30 includes first and second yoke ears 34, 36 extending longitudinally relative to a central axis C. Referring to FIG. 3, each of the first and second yoke ears 34, 36 includes respective aligned bores 34a, 36a configured to receive bearing cups (not shown) and other components of the first articulating joint assembly 32 (of FIG. 1). Referring to FIG. 1, a second articulating joint assembly 38 may be operatively connected to the second tube end 26 of the driveshaft tube 24.

Referring to FIGS. 1 and 3, the driveshaft assembly 12 includes a torque control mechanism 40 operatively connected to the end fitting 30. The torque control mechanism 40 includes an outer member 42, shown in FIGS. 2-3. Referring to FIG. 2, the outer member 42 defines a first conical surface 44 extending circumferentially relative to the central axis C. Referring to FIG. 2, the outer member 42 may include a surface 46 contiguous with the first conical surface 44 and substantially parallel to a radial direction A. The outer member 42 may be integrally formed with the end fitting 30. In one embodiment, the end fitting 30 and the outer member 42 are forged together as an integral piece. In another embodiment, the end fitting 30 and the outer member 42 are cast together as an integral piece. In yet another embodiment, the end fitting 30 and the outer member 42 may be cast as separate pieces and joined together.

Referring to FIG. 3, the torque control mechanism 40 includes an inner member 48 configured to engage with the outer member 42 and having respective first and second inner ends 50, 52. Referring to FIG. 3, the inner member 48 defines a second conical surface 54 extending circumferentially around relative to the central axis C at the first inner end 50. The first and second conical surfaces 44, 54 have a substantially frusto-conical shape, that is, the shape of a cone with the narrow end removed. The second conical surface 54 in configured to be in a tight-fit contact with the first conical surface 44.

Referring to FIG. 3, the second conical surface 54 is dimensioned and positioned to fit sufficiently tightly inside the first conical surface 44 of the outer member 42 such that, during regular operation, the first and second conical surfaces 44, 54 rotate synchronously, with torque load being transmitted from the second conical surface 54 (inner member 48) to the first conical surface 44 (outer member 42) by frictional engagement. The torque load that can be transmitted depends on the friction force between the second conical surface 54 and the first conical surface 44. The friction force depends, at least in part, on the friction coefficient of the materials used for the first and second conical surfaces 44, 54.

When the torque load to be transmitted is greater than the amount that can be transmitted by the friction force, the second conical surface 54 is configured to be angularly displaced or slip relative to the first conical surface 44 along the central axis C at a slip angle 56 (or vice-versa). In other words, the second conical surface 54 is configured to rotate relative to the first conical surface 44 along the central axis C at a slip angle 56 when the torque load exceeds a predefined maximum torque load. The slip angle 56 may be clockwise or counter-clockwise relative to the central axis C. The slip angle 56 is dependent on the torque load such that an increase/decrease in the torque load leads to an increase/decrease in the slip angle 56. The slip angle 56 may be any angle. In one non-limiting example, the slip angle 56 is a few revolutions. In another non-limiting example, the slip angle 56 is about 15 degrees. The efficiency of torque transfer may be tuned by the selection of a high friction coating material on the first and second conical surfaces 44, 54. The first and second conical surfaces 44, 54 may be modified with coatings, platings or with heat treatment processes to modify their frictional or wear characteristics. In a non-limiting example, the first and second conical surfaces 44, 54 may each be treated with a coating of an epoxy-resin.

Referring to FIG. 3, the second conical surface 54 of the inner member 48 is contiguous with or positioned between first and second inner surfaces 58, 60. Referring to FIG. 2, a radial direction A is shown that is perpendicular to the central axis C. The first and second inner surfaces 58, 60 may extend in a plane that is substantially perpendicular to the central axis C or substantially parallel to the radial direction A. In a non-limiting example, the first and second inner surfaces 58, 60 have respective diameters of approximately 55 and 65 mm. The inner and outer members 48, 42 may be composed of any suitable materials that are sufficiently stiff to allow torque to be transferred from the inner member 48 to the outer member 42. The torque control mechanism 40 is located outside of the area between the first and second articulating joint assemblies 32, 38 (shown in FIG. 1) as the relative angular displacement of the first and second conical surfaces 44, 54 may change a phase angle of the first and second articulating joint assemblies 32, 38.

Referring to FIG. 1, as noted above, the driveshaft assembly 12 may be operatively connected to an output member 18 of a transmission 16 in a vehicle 10. Referring to FIG. 3, the output member 18 may include a sleeve portion 64, which is hollow and may be substantially cylindrical with varying diameters along its length. The output member 18 is configured to supply the torque load to the inner member 48. The sleeve portion 64 includes an interior splined portion 68. The inner member 48 defines an exterior splined portion 66 at the respective second inner end. Referring to FIG. 3, the interior splined portion 68 of the output member 18 is configured to rotatably engage with the exterior splined portion 66 of the inner member 48 in order to supply the torque load to the inner member 48.

Referring to FIG. 3, a first through-hole 70 extends between the respective first and the second inner ends 50, 52 of the inner member 48. Referring to FIGS. 2-3, a second through-hole 71 extends through the outer member 42. The first and second through-holes 70, 71 are co-axially aligned relative to the central axis C. Referring to FIG. 3, a fastener 72 is configured to extend through the first and second through-holes 70, 71. The fastener 72 includes a head 74 and a shank 76. The shank 76 defines an external threaded portion 78.

Referring to FIG. 3, a securing member 80 may be operatively connected to the fastener 72. The securing member 80 includes a cavity 82 configured to receive the fastener 72. Referring to FIG. 3, the cavity 82 includes an internal threaded portion 84 configured to correspond with the external threaded portion 78 of the fastener 72. The securing member 80 is tightened onto the fastener 72. The torque applied to tighten the securing member 80 results in a tension at the joint, referred to herein as the fastener tension. Thus the internal threaded portion 84 of the securing member 80 and the external threaded portion 78 of the fastener 72 are configured to be in contact so as to define the fastener tension. The predefined maximum torque load may be calibrated through the torque applied to tighten the securing member 80 to the fastener 72. The predefined maximum torque load is proportional to the fastener tension such that an increase in the fastener tension leads to an increase in the predefined maximum torque load.

Figure 4:
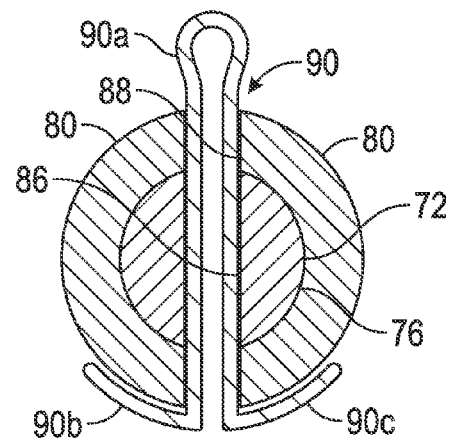
FIG. 4 is a schematic sectional view through axis 4-4 shown in FIG. 3.

FIG. 4 is a schematic sectional view through axis 4-4 shown in FIG. 3. Referring to FIG. 4, the shank 76 of the fastener 72 may define a slot 86. Referring to FIG. 4, the securing member 80 may define at least one passageway 88. The slot 86 and passageway 88 may extend in a direction substantially perpendicular to the central axis C, such as radial direction A shown in FIG. 2. Referring to FIG. 4, a pin 90 is configured to extend through the slot 86 in the fastener 72 and the passageway 88 in the securing member 80. Any type of pin known to those skilled in the art may be employed. Referring to FIG. 4, the pin 90 includes a pin body 90*a* and first and second pin ends 90*b*, 90*c*. The first and second pin ends 90*b*, 90*c* are each configured to be folded relative to the pin body 90*a*. The pin 90 is configured to retain the position of the securing member 80 when the second conical surface 54 rotates relative to the first conical surface 44 along the central axis C at a slip angle 56, which occurs when the torque load exceeds a predefined maximum torque load.

Referring to FIG. 3, a seal member 92 (also shown in FIG. 1) is configured to at least partially encapsulate respective portions of the inner member 48, the outer member 42 and the output member 18. The seal member 92 is configured to prevent contaminants from interfering with any one of the inner member 48, the outer member 42 and the output member 18. Referring to FIG. 3, the seal member 92 defines first and second ridges 94, 96 extending circumferentially around the central axis C. The second ridge 96 is axially spaced from the first ridge 94. The seal member 92 defines a valley 98 between the first and second ridges 94, 96. While the seal member 92 may include two ridges in the example shown, the seal member 92 may include any number of ridges, which may be more or less than two. In non-limiting examples, the seal member 92 may include one or four ridges. Referring to FIG. 3, a clamping member 100 (also shown in FIG. 1) may be positioned sufficiently tightly around the seal member 92 so as to prevent a relative motion between the seal member 92 and the outer member 42.

The seal member 92 may be composed of a non-metal. The seal member may be composed of a flexible material that offers a surface that is useful for sealing. In one example, the seal member 92 is composed of an elastomer such as a synthetic rubber or rubber-like material, including but not limited to, ethylene-propylene terpolymer (EPDM), neoprene (polychloroprene), styrenebutadiene rubber, nitrile rubbers or silicone rubbers. In one embodiment, the seal member 92 is composed of a copolymer of butadiene and acrylonitrile.

Referring to FIG. 3, a first washer 102 may be positioned at least partially around the fastener 72, between the securing member 80 and the inner member 48. The first washer 102 is configured to retain the relative positions of the securing member 80 and the fastener 72 when the first and second conical surfaces rotate at the slip angle 56, which occurs when the torque load exceeds a predefined maximum torque load. Referring to FIG. 3, a second washer 104 may be operatively connected between the head 74 of the fastener 72 and the end fitting 30. The fastener 72 may include multiple washers at each location, i.e., the first and second washers 102, 104 may be double washers in order to further prevent changes in fastener tension if the second conical surface 54 rotates relative to the first conical surface 44.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A driveshaft assembly for use in a vehicle, the assembly comprising:
   a driveshaft tube having two ends;
   an end fitting operatively connected to one of the two ends of the driveshaft tube, the end fitting having first and second yoke ears;
   a torque control mechanism operatively connected to the end fitting, the torque control mechanism including:
      an outer member defining a first conical surface extending circumferentially relative to a central axis;
      an inner member configured to engage with the outer member and having respective first and second inner ends, the inner member defining a second conical surface extending circumferentially relative to the central axis at the respective first inner end;
      wherein the inner member defines a first through-hole extending between the respective first and second inner ends of the inner member;
      wherein the outer member defines a second through-hole extending through the outer member, the first and second through-holes being co-axially aligned relative to the central axis;
      a fastener configured to extend through the first and second through-holes and having a slot, the slot extending in a direction substantially perpendicular to the central axis;
      a securing member operatively connected to the fastener and having at least one passageway; and
      a pin configured to extend through the slot in the fastener and the at least one passageway in the securing member;
   wherein the first conical surface is configured to be in contact with the second conical surface so as to transfer a torque load from the inner member to the outer member;

wherein a predefined maximum torque load that can be transmitted from the inner member to the outer member depends at least partially on a friction force between the first and second conical surfaces, the first and second conical surfaces rotating synchronously when the torque load is less than the predefined maximum torque load; and wherein the second conical surface is configured to be angularly displaced relative to the first conical surface along the central axis at a slip angle when the torque load exceeds the predefined maximum torque load.

2. The driveshaft assembly of claim 1, wherein the outer member is integrally formed with the end fitting.

3. The driveshaft assembly of claim 1, in combination with an output member configured to supply the torque load to the inner member, wherein:
the output member includes a sleeve with an interior splined portion; and
the inner member defines an exterior splined portion at the respective second inner end.

4. The driveshaft assembly of claim 3, wherein the interior splined portion of the output member is configured to rotatably engage with the exterior splined portion of the inner member in order to supply the torque load to the inner member.

5. The driveshaft assembly of claim 1:
wherein the fastener includes a head and a shank, the shank defining an external threaded portion;
wherein the internal threaded portion of the securing member and the external threaded portion of the fastener are configured to be in contact so as to define a fastener tension; and
wherein the predefined maximum torque load is proportional to the fastener tension such that an increase in the fastener tension leads to an increase in the predefined maximum torque load.

6. The driveshaft assembly of claim 1, further comprising:
a first washer positioned at least partially around the fastener and between the securing member and the inner member.

7. The driveshaft assembly of claim 1, wherein the pin includes a pin body and first and second pin ends, the first and second pin ends each configured to be folded relative to the pin body.

8. The driveshaft assembly of claim 1, further comprising:
a seal member configured to at least partially encapsulate the inner member and the outer member at the respective first inner end;
wherein the seal member defines first and second ridges extending around the central axis, the second ridge being axially spaced from the first ridge;
wherein the seal member defines a valley between the first and second ridges; and
a clamping member positioned sufficiently tightly around the seal member so as to prevent a relative motion between the seal member and the outer member.

9. The driveshaft assembly of claim 8, wherein the seal member is composed of an elastomeric material.

10. The driveshaft assembly of claim 1, wherein the securing member includes a cavity having an internal threaded portion and configured to receive the fastener.

11. A vehicle comprising:
a transmission having an output member;
a driveshaft assembly operatively connected to the output member, the driveshaft assembly including:
a driveshaft tube having two ends;
an end fitting operatively connected to one of the two ends of the driveshaft tube, the end fitting having first and second yoke ears;
a torque control mechanism operatively connected to the end fitting, the torque control mechanism including:
an outer member defining a first conical surface extending circumferentially relative to a central axis;
an inner member configured to engage with the outer member and having respective first and second inner ends, the inner member defining a second conical surface extending circumferentially relative to the central axis at the respective first inner end;
wherein the inner member defines a first through-hole extending between the respective first and second inner ends of the inner member;
wherein the outer member defines a second through-hole extending through the outer member, the first and second through-holes being co-axially aligned relative to the central axis;
a fastener configured to extend through the first and second through-holes and having a slot, the slot extending in a direction substantially perpendicular to the central axis;
a securing member operatively connected to the fastener and having at least one passageway; and
a pin configured to extend through the slot in the fastener and the at least one passageway in the securing member;
wherein the first conical surface is configured to be in contact with the second conical surface so as to transfer a torque load from the inner member to the outer member;
wherein a predefined maximum torque load that can be transmitted from the inner member to the outer member depends at least partially on a friction force between the first and second conical surfaces, the first and second conical surfaces rotating synchronously when the torque load is less than the predefined maximum torque load; and
wherein the second conical surface is configured to be angularly displaced relative to the first conical surface along the central axis at a slip angle when the torque load exceeds the predefined maximum torque load.

12. The vehicle of claim 11, wherein the outer member is integrally formed with the end fitting.

13. The vehicle of claim 11, wherein:
the output member is configured to supply the torque load to the inner member, wherein:
the output member includes a sleeve with an interior splined portion;
the inner member defines an exterior splined portion at the respective second inner end; and
the interior splined portion of the output member is configured to rotatably engage with the exterior splined portion of the inner member in order to supply the torque load to the inner member.

14. The vehicle of claim 11:
wherein the fastener includes a head and a shank, the shank defining an external threaded portion;
wherein the internal threaded portion of the securing member and the external threaded portion of the fastener are configured to be in contact so as to define a fastener tension; and wherein the predefined maximum torque load is proportional to the fastener tension such that an increase in the fastener tension leads to an increase in the predefined maximum torque load.

15. The vehicle of claim 11, wherein the pin includes a pin body and first and second pin ends, the first and second pin ends each configured to be folded relative to the pin body.

16. The vehicle of claim 11, further comprising:
a seal member configured to at least partially encapsulate the inner member and the outer member at the respective first inner end;
wherein the seal member defines first and second ridges extending around the central axis, the second ridge being axially spaced from the first ridge;
wherein the seal member defines a valley between the first and second ridges; and
a clamping member positioned sufficiently tightly around the seal member so as to prevent a relative motion between the seal member and the outer member.

17. The vehicle of claim 11, wherein the securing member includes a cavity having an internal threaded portion and configured to receive the fastener.

\* \* \* \* \*